United States Patent
Takao et al.

(10) Patent No.: US 10,576,827 B2
(45) Date of Patent: Mar. 3, 2020

(54) BATTERY MANAGEMENT DEVICE AND POWER SUPPLY SYSTEM

(71) Applicant: PANASONIC INTELLECTUAL PROPERTY MANAGEMENT CO., LTD., Osaka (JP)

(72) Inventors: Hiroshi Takao, Osaka (JP); Noriharu Kobayashi, Hyogo (JP); Hoshihito Okada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 204 days.

(21) Appl. No.: 15/570,239

(22) PCT Filed: Apr. 7, 2016

(86) PCT No.: PCT/JP2016/001941
§ 371 (c)(1),
(2) Date: Dec. 19, 2017

(87) PCT Pub. No.: WO2016/174828
PCT Pub. Date: Nov. 3, 2016

(65) Prior Publication Data
US 2018/0093569 A1 Apr. 5, 2018

(30) Foreign Application Priority Data
Apr. 27, 2015 (JP) .................. 2015-090628

(51) Int. Cl.
*B60L 3/00* (2019.01)
*H01M 10/48* (2006.01)
(Continued)

(52) U.S. Cl.
CPC ............... *B60L 3/0046* (2013.01); *B60L 3/04* (2013.01); *H01M 10/425* (2013.01);
(Continued)

(58) Field of Classification Search
CPC ....... B60L 3/04; H01M 10/425; H01M 10/48; H02J 1/06; H02J 7/0031
(Continued)

(56) References Cited

U.S. PATENT DOCUMENTS

2011/0140669 A1   6/2011   Murakami et al.

FOREIGN PATENT DOCUMENTS

| CN | 103036271 A | 4/2013 |
|----|-------------|--------|
| JP | 2009-159755 A | 7/2009 |

(Continued)

OTHER PUBLICATIONS

International Search Report issued in International Patent Application No. PCT/JP2016/001941, dated May 10, 2016; with English translation.

(Continued)

*Primary Examiner* — Maceeh Anwari
(74) *Attorney, Agent, or Firm* — McDermott Will & Emery LLP

(57) ABSTRACT

A driver controls a switch inserted in a current path between a secondary battery and an inverter that drives a motor. A first abnormality detector instructs the driver to turn off the switch when an abnormality of the secondary battery is detected. A second abnormality detector is disposed in parallel with the first abnormality detector, and instructs the driver to turn off the switch when the abnormality of the secondary battery is detected. The first abnormality detector suspends an instruction to turn off the switch to the driver, even when the abnormality of the secondary battery is detected, in cases where an ECU instructs discharge-stop prohibition of the secondary battery. The second abnormality detector instructs the driver to turn off the switch after a (Continued)

lapse of a certain time from when the abnormality of the secondary battery is detected, regardless of an instruction from the ECU.

4 Claims, 6 Drawing Sheets

(51) Int. Cl.
  *H01M 10/42* (2006.01)
  *H02J 1/06* (2006.01)
  *B60L 3/04* (2006.01)
  *H02J 7/00* (2006.01)

(52) U.S. Cl.
  CPC .............. *H01M 10/48* (2013.01); *H02J 1/06* (2013.01); *H02J 7/0031* (2013.01); *B60L 2240/54* (2013.01); *B60L 2240/547* (2013.01); *B60L 2240/549* (2013.01); *B60L 2240/80* (2013.01); *B60L 2250/10* (2013.01); *H01M 2010/4271* (2013.01); *H01M 2220/20* (2013.01)

(58) Field of Classification Search
  USPC ........................................................ 701/34.4
  See application file for complete search history.

(56) References Cited

FOREIGN PATENT DOCUMENTS

| | | | |
|---|---|---|---|
| JP | 2010-203790 A | | 9/2010 |
| JP | 2010203790 A | * | 9/2010 |
| JP | 2011-127969 A | | 6/2011 |
| JP | 2013-072711 A | | 4/2013 |
| JP | 2013-081313 A | | 5/2013 |
| JP | 201381313 A | * | 5/2013 |

OTHER PUBLICATIONS

Written Opinion of the International Searching Authority issued in International Patent Application No. PCT/JP2016/001941, dated May 10, 2016; with English translation.

English Translation of Chinese Search Report dated Nov. 25, 2019 for the related Chinese Patent Application Vo. 201680033360.9.

* cited by examiner

BATTERY MANAGEMENT DEVICE AND POWER SUPPLY SYSTEM

RELATED APPLICATIONS

This application is the U.S. National Phase under 35 U.S.C. § 371 of International Patent Application No. PCT/JP2016/001941, filed on Apr. 7, 2016, which in turn claims the benefit of Japanese Application No. 2015-090628, filed on Apr. 27, 2015, the entire disclosures of which Applications are incorporated by reference herein.

TECHNICAL FIELD

The present invention relates to a battery management device that manages a secondary battery that is to be mounted on a vehicle, and a power supply system.

BACKGROUND ART

In recent years, an electric vehicle (EV) and a hybrid vehicle have been widely used. A lithium ion battery and a nickel hydride battery have been widely used as a vehicular secondary battery. The secondary battery needs management of a voltage, a current, and a temperature, and particularly the lithium ion battery demands strict management. When overvoltage or overcurrent is occurred, a burden is imposed on the battery, thereby shortening battery life. Accordingly, when detecting these abnormalities, a battery management device controls such that the secondary battery is electrically disconnected from a vehicle side by opening a contactor, to protect the secondary battery (refer to PTL 1, for example).

To more reliably make control for opening the contactor in detection of overvoltage, a redundant configuration in which two overvoltage detection circuits are provided in parallel is often used.

CITATION LIST

Patent Literature

PTL 1: Unexamined Japanese Patent Publication No. 2009-159755

SUMMARY OF THE INVENTION

When a contactor is opened upon detecting overvoltage, power supply from a secondary battery to a motor is stopped, and rotation of the motor is thereby stopped. In a case of a genuine EV provided with no engine, the motor stops and the vehicle then stops traveling. The vehicle that suddenly stops driving during traveling is unsafe, because of a possibility of a collision with other vehicles. Accordingly, a vehicle side requests to stop the vehicle at a safe location as much as possible, even when an abnormality is occurred in the battery.

The present invention is made in light of such circumstances, and an object of the present invention is to provide a technique that protects a battery while securing safety of a vehicle, when an abnormality is occurred in the battery.

To solve the above-described problem, a battery management device according to an aspect of the present invention is a battery management device that manages a secondary battery that is to be mounted on a vehicle. The battery management device includes the secondary battery, a driver configured to drive a switch inserted into a current path between the secondary battery and an inverter that drives a motor, a first abnormality detector configured to instruct the driver to turn off the switch when an abnormality of the secondary battery is detected, and a second abnormality detector that is disposed in parallel with the first abnormality detector, and instructs the driver to turn off the switch when the abnormality of the secondary battery is detected. The first abnormality detector suspends an instruction to turn off the switch to the driver, even when the abnormality of the secondary battery is detected, in cases where an electronic controller that manages and controls the vehicle instructs discharge-stop prohibition of the secondary battery, and the second abnormality detector instructs the driver to turn off the switch after a lapse of a certain time from when the abnormality of the secondary battery is detected, regardless of an instruction from the electronic controller.

According to the present invention, when an abnormality is occurred in a battery, the battery is protected while securing safety of a vehicle.

DESCRIPTION OF EMBODIMENT

Figure 1:
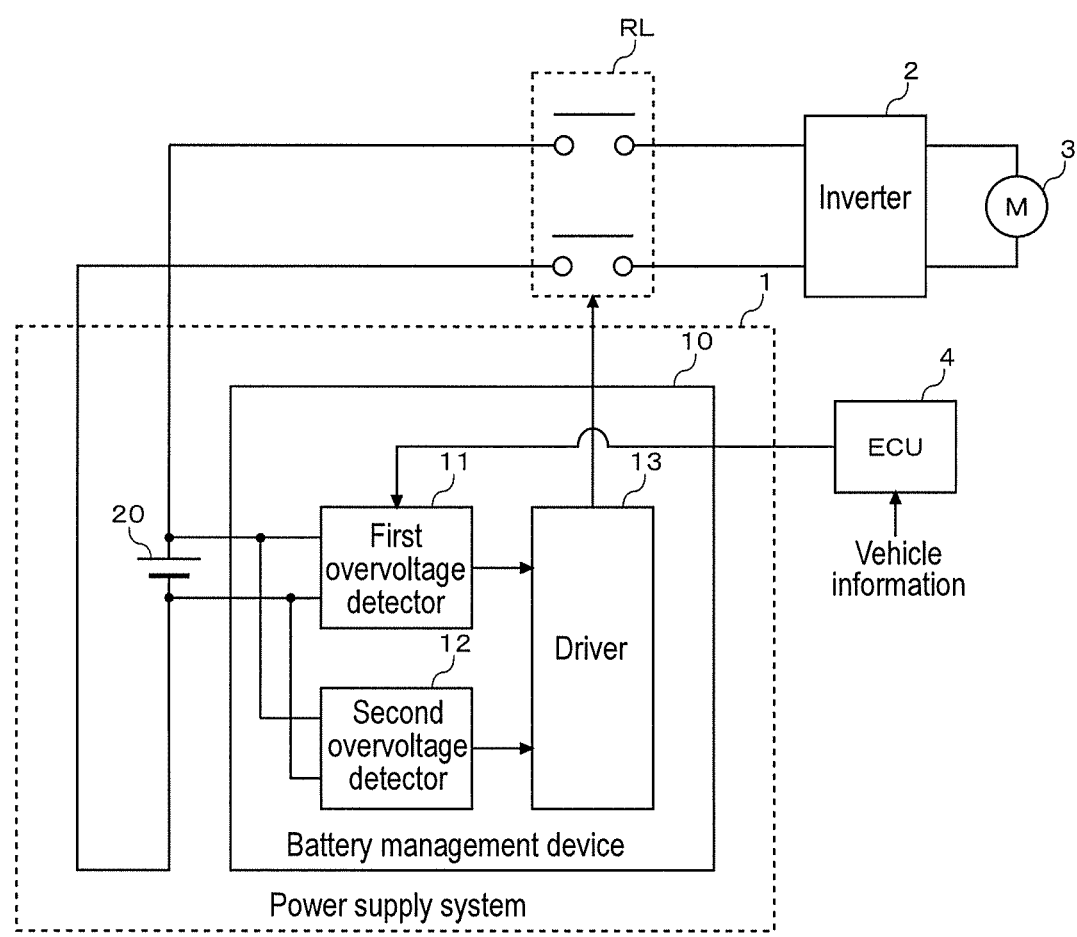
FIG. 1 is a diagram for describing a power supply system according to an exemplary embodiment of the present invention.

FIG. 1 is a diagram for describing power supply system 1 according to an exemplary embodiment of the present invention. Power supply system 1 is mounted on a vehicle, and is connected to motor 3 via contactor RL and inverter 2. At the time of power running, inverter 2 converts DC power supplied from power supply system 1 into AC power to supply the converted AC power to motor 3. At the time of regeneration, inverter 2 converts AC power supplied from motor 3 into DC power to supply the converted DC power to power supply system 1. Contactor RL is inserted into a current path between secondary battery 20 and motor 3. Note that contactor RL is an example of a device for electrically disconnect power supply system 1 and a vehicle side, and any other kind of device may be used as long as the device has a switching function capable of interrupting a current flowing between power supply system 1 and the vehicle side.

Electronic control unit (ECU) 4 electrically manages and controls the vehicle. For example, ECU 4 collects vehicle information from various sensors in the vehicle, and outputs control signals to various auxiliaries in the vehicle based on the vehicle information. ECU 4 is connected to power supply system 1 via an in-vehicle network such as a controller area network (CAN), and transmits and receives the control signals to and from power supply system 1.

Power supply system 1 includes secondary battery 20 and battery management device 10. Secondary battery 20 is configured by connecting a plurality of battery cells in series. In the present exemplary embodiment, it is assumed to use lithium ion batteries as the battery cells. A nominal voltage of the lithium ion battery ranges from 3.6 V to 3.7 V, and the number of series connections of the battery cells is determined according to a kind of motor 3. The lithium ion battery requires to strictly maintain cell balance, and therefore a voltage of each cell is detected. In the nickel hydride battery, a voltage in a cell unit is not necessarily managed as strict as in the lithium ion battery, and only a voltage of whole secondary battery 20 may be managed.

Battery management device 10 includes first overvoltage detector 11, second overvoltage detector 12, and driver 13. In battery management device 10 of FIG. 1, only a configuration related to an overvoltage detection process, to which the present exemplary embodiment gives attention, is illustrated. Hereinafter, the overvoltage detection process performed by battery management device 10 will be mainly described.

Driver 13 generates a drive signal for controlling an opening/closing state of contactor RL and supplies the generated drive signal to contactor RL. When contactor RL is configured with an electromagnetic relay, driver 13 generates a drive current for magnetizing/demagnetizing a coil and supplies the generated current to the coil.

First overvoltage detector 11 and second overvoltage detector 12 are provided in parallel relative to secondary battery 20. When detecting overvoltage of secondary battery 20, first overvoltage detector 11 instructs driver 13 to open (turn off) contactor RL. When detecting overvoltage of secondary battery 20, second overvoltage detector 12 also instructs driver 13 to open (turn off) contactor RL. The overvoltage detector is duplicated in this manner. Even if a malfunction is occurred in either one of the overvoltage detectors, overvoltage can be detected.

In the present exemplary embodiment, first overvoltage detector 11 and second overvoltage detector 12 are not duplicated in a simple manner, but respectively have different roles. In cases where stop prohibition is instructed from ECU 4, first overvoltage detector 11 suspends output of an opening signal that instructs to open the contactor to driver 13, even when detecting the overvoltage of secondary battery 20. In cases where stop permission is instructed from ECU 4, first overvoltage detector 11 immediately outputs the opening signal to driver 13, when detecting the overvoltage of secondary battery 20.

Meanwhile, second overvoltage detector 12 outputs to driver 13 an opening signal that instructs to open the contactor, after a lapse of a certain time (for example, 10 seconds) from when the overvoltage of secondary battery 20 is detected, regardless of the instruction from ECU 4. The delay time from detection of overvoltage to output of the opening signal is set to a value that is derived by a designer based on a breakdown voltage specification of secondary battery 20, a time period for safely stopping a vehicle, and the like.

Further, in the present exemplary embodiment, first overvoltage detector 11 and second overvoltage detector 12 each are controlled by different methods from each other. First overvoltage detector 11 is controlled by software, and second overvoltage detector 12 is controlled by hardware.

Figure 2:
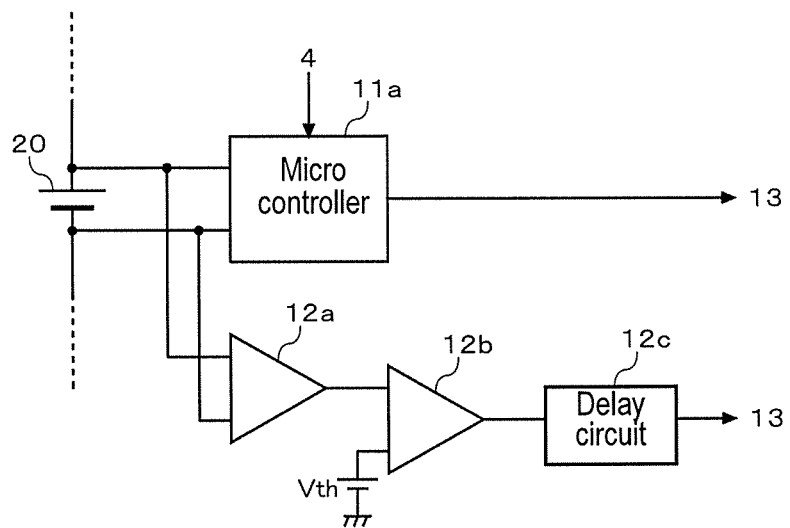
FIG. 2 is a diagram illustrating configuration examples of a first overvoltage detector and a second overvoltage detector in FIG. 1.

FIG. 2 is a diagram illustrating configuration examples of first overvoltage detector 11 and second overvoltage detector 12 in FIG. 1. In FIG. 2, first overvoltage detector 11 is configured with microcontroller 11a. Microcontroller 11a includes a voltage detection circuit, an A-D converter, and a central processing unit (CPU) that operates according to firmware. The voltage detection circuit detects a voltage across secondary battery 20, and outputs the detected voltage to the A-D converter. The A-D converter converts the input analog voltage into a digital value, and outputs the digital value to the CPU. The CPU receives the voltage value signal of secondary battery 20 from the A-D converter, and receives a discharge-stop permitting/prohibiting signal from ECU 4. The CPU determines whether contactor RL is to be opened or closed based on the signal, and outputs an opening/closing signal to driver 13.

Second overvoltage detector 12 is configured with differential amplifier 12a, comparator 12b, and delay circuit 12c. Differential amplifier 12a amplifies the voltage across secondary battery 20, and outputs the amplified voltage to one of input terminals of comparator 12b. Threshold voltage Vth for overvoltage detection is input to the other of the input terminals of comparator 12b. When the voltage of secondary battery 20 to be input exceeds threshold voltage Vth, comparator 12b outputs a significant level (for example, a high level) signal. When the voltage of secondary battery 20 is threshold voltage Vth or less, comparator 12b outputs a non-significant level (for example, a low level) signal. Delay circuit 12c outputs an output signal of comparator 12b to driver 13 by delaying the output signal by a certain time.

Differential amplifier 12a and comparator 12b each can be configured with a combination of an operational amplifier and resistors. Delay circuit 12c can be configured with cascade connection of a plurality of inverter elements, for example. In this manner, second overvoltage detector 12 is configured with only analog elements. Second overvoltage detector 12 does not receive the discharge-stop permitting/prohibiting signal from ECU 4.

Figure 3:
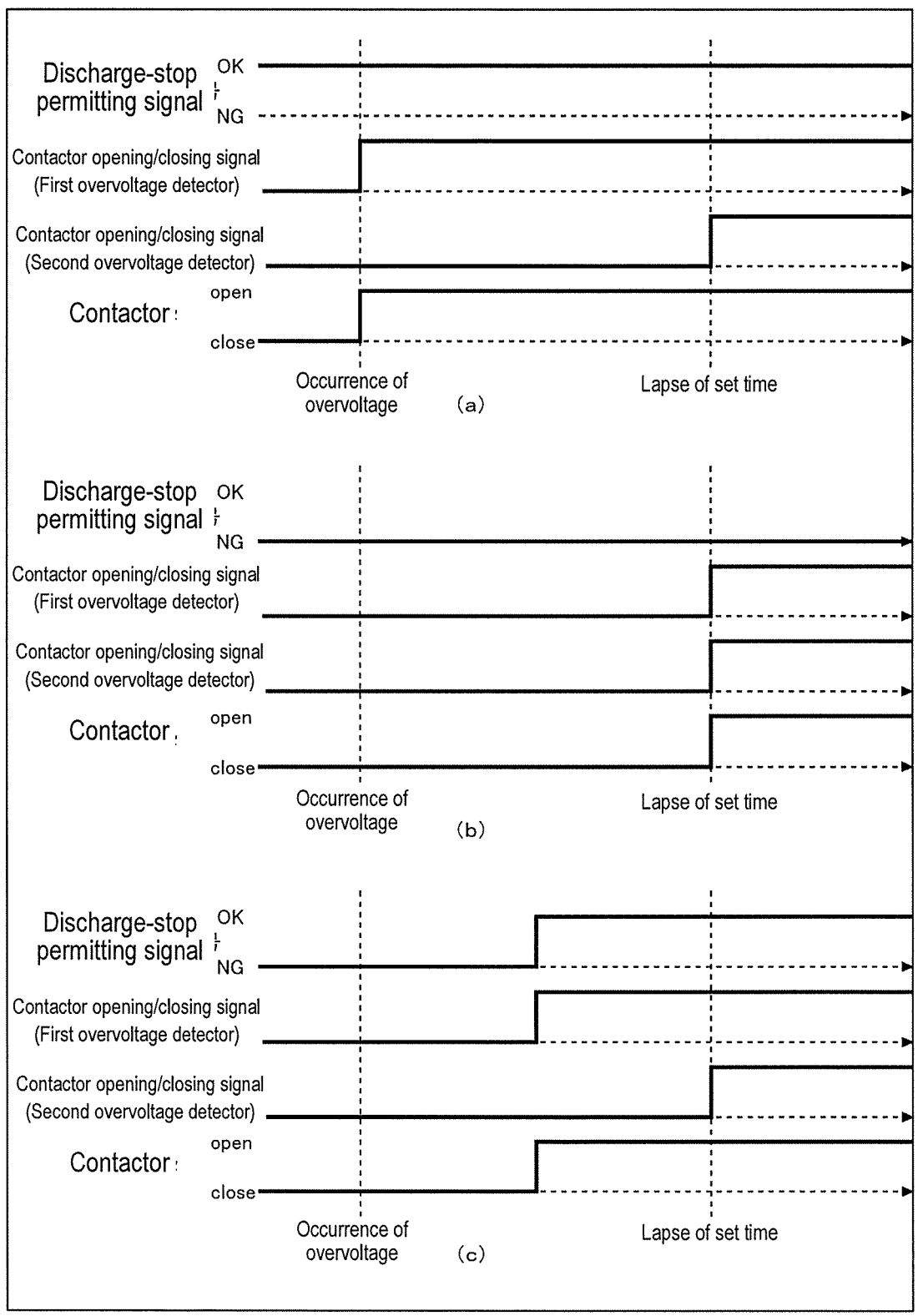
FIG. 3 is a timing chart illustrating operation examples of a battery management device according to the exemplary embodiment of the present invention, when overvoltage is detected.

Parts (a) to (c) of FIG. 3 are timing charts illustrating operation examples of battery management device 10 according to the exemplary embodiment of the present invention, when overvoltage is detected. Part (a) of FIG. 3 is an example of a case where a discharge-stop permitting signal (discharge-stop permitting signal "OK") is output to first overvoltage detector 11 from ECU 4. In this example, when detecting overvoltage, first overvoltage detector 11 causes a contactor opening/closing signal to transit from closing to opening without delay. At this moment, contactor RL is opened, and therefore discharge from secondary battery 20 to motor 3 is stopped. Second overvoltage detector 12 causes the contactor opening/closing signal to transit from closing to opening, after a lapse of a set time from when overvoltage is detected. From this moment, duplication of overvoltage protection is established. Even if a malfunction is occurred in first overvoltage detector 11, contactor RL can be opened from this moment.

Part (b) of FIG. 3 is an example of a case where a discharge-stop prohibiting signal (discharge-stop permitting signal "NG") is output to first overvoltage detector 11 from ECU 4. In this example, after a lapse of a set time from when the overvoltage is detected, first overvoltage detector 11 causes the contactor opening/closing signal to transit from closing to opening. After the lapse of the set time from when the overvoltage is detected, second overvoltage detector 12 also causes the contactor opening/closing signal to transit from closing to opening. At this moment, contactor RL is opened, and therefore discharge from secondary battery 20 to motor 3 is stopped. From a moment when contactor RL is opened, duplication of overvoltage protection is established.

Note that in a state where the discharge-stop prohibiting signal is input to first overvoltage detector 11, first overvoltage detector 11 may be set so as to maintain the closed state of contactor opening/closing signal. As illustrated in part (b) of FIG. 3, the setting in which the contactor opening/closing signal is caused to transit from closing to opening after the lapse of the set time even in the state in which the discharge-stop prohibiting signal is input to first overvoltage detector 11 has an advantage that contactor RL can be opened even when a malfunction is occurred in second overvoltage detector 12.

Part (c) of FIG. 3 is an example of a case where an instruction signal from ECU 4 to first overvoltage detector 11 switches from discharge-stop prohibiting to discharge-stop permitting after occurrence of overvoltage. In this example, even when detecting overvoltage, first overvoltage detector 11 does not cause the contactor opening/closing signal to transit from closing to opening immediately, and causes the contactor opening/closing signal to transit to opening at a moment when the instruction signal from ECU 4 is switched to discharge-stop permitting. At this moment, contactor RL is opened, and therefore discharge from secondary battery 20 to motor 3 is stopped. After the lapse of the set time from when overvoltage is detected, second overvoltage detector 12 causes the contactor opening/closing signal to transit from closing to opening. From this moment, duplication of overvoltage protection is established.

Figure 4:
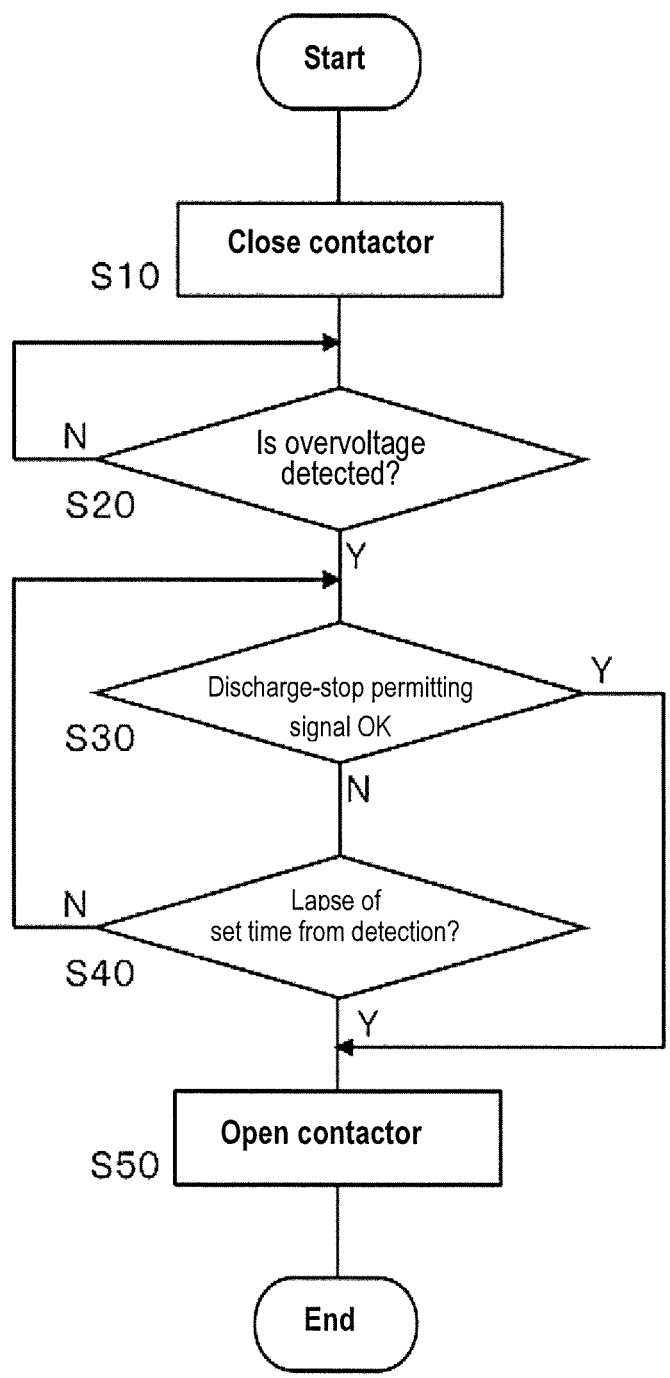
FIG. 4 is a flowchart for describing an operation of the battery management device according to the exemplary embodiment of the present invention, when overvoltage is detected.

FIG. 4 is a flowchart for describing an operation of battery management device 10 according to the exemplary embodiment of the present invention, when overvoltage is detected. When instructed from ECU 4 to start traveling, battery management device 10 closes contactor RL (S10). When detecting overvoltage (Y in S20), battery management device 10 confirms whether the discharge stop signal from ECU 4 is permission (OK) or prohibition (NG) (S30). When the discharge stop signal is the permission (OK) (Y in S30), battery management device 10 immediately opens contactor RL (S50). When the discharge stop signal is the prohibition (NG) (N in S30), after the lapse of the set time (Y in S40), battery management device 10 opens contactor RL (S50).

Hereinafter, an example of a criterion for determining whether ECU 4 outputs the discharge-stop permitting signal or the discharge-stop prohibiting signal will be described. In a simplest example, the discharge-stop permitting signal is output when the vehicle stops, and the discharge-stop prohibiting signal is output when the vehicle travels. When the vehicle stops, stoppage of the discharge from secondary battery 20 to motor 3 is relatively safe. Meanwhile, when motor 3 suddenly stops during traveling, safety cannot be secured.

Figure 5:
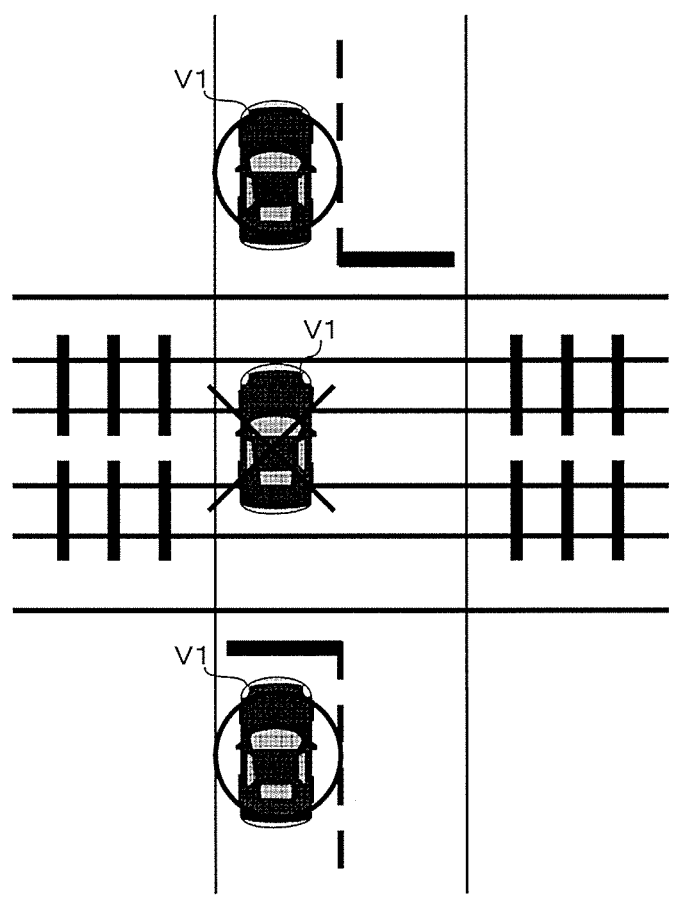
FIG. 5 is a view for describing a processing example in a case where overvoltage is occurred when a vehicle passes through a railway crossing.

FIG. 5 is a view for describing a processing example in a case where overvoltage is occurred when the vehicle passes through a railway crossing. When overvoltage is occurred in a state where vehicle V1 stops in front of a stop line before passing through the railway crossing, in the present exemplary embodiment, battery management device 10 immediately opens contactor RL to stop discharging because the discharge-stop permitting signal is output from ECU 4 to first overvoltage detector 11.

It is unsafe that the vehicle suddenly stops during passing through the railway crossing. When overvoltage is occurred during passing through the railway crossing, in the present exemplary embodiment, battery management device 10 opens contactor RL after the lapse of the set time because the discharge-stop prohibiting signal is output from ECU 4 to first overvoltage detector 11. When, for example, approximately 10 seconds is available from occurrence of overvoltage to discharge stoppage as a margin, the vehicle can finish passing through the railway crossing and escape from the inside of the railway crossing.

As another example of the criterion described above, when a vehicle speed is a set value (for example, 10 km/h) or less, the discharge-stop permitting signal may be output, and when the vehicle speed exceeds the set value, the discharge-stop prohibiting signal may be output. When the vehicle speed is low, a risk relatively decreases. Therefore, design can be made so as to prioritize battery protection. As yet another example, the discharge-stop permitting signal may be output during traveling straight, and the discharge-stop prohibiting signal may be output during traveling in curve. During traveling in curve, the vehicle may collide with an oncoming vehicle, and the risk is therefore increased more than during traveling straight. Accordingly, design is made such that a traveling vehicle is not allowed to stop during a time period necessary to finish traveling in curve.

As described above, according to the present exemplary embodiment, in a state where the risk is high, even when overvoltage is occurred in secondary battery 20, the discharge is not caused to stop immediately, and is caused to stop after the lapse of the certain time. With this configuration, sudden stoppage of the vehicle in an unsafe state can be prevented, and a balance between vehicle safety and battery protection can be made satisfactory. Furthermore, the overvoltage detector having the redundant configuration can more reliably prevent charging and discharging secondary battery 20 in an overvoltage state.

When the overvoltage detector is duplicated, one detector is controlled by software, and the other detector is controlled by hardware. This configuration can further decrease a probability in which both functions of the detectors are stopped. The discharge-stop permitting/prohibiting signal from ECU 4 is input to the overvoltage detector controlled by software, thereby lessening complexity of circuit design. In the overvoltage detector controlled by software, the signal from ECU 4 is simply input to an external input port of the microcontroller. However, the overvoltage detector controlled by hardware needs an additional element such as an AND circuit. Accordingly, the configuration in which the signal from ECU 4 is input to the overvoltage detector controlled by software can suppress an increase in circuit scale and cost.

The present invention is described based on the exemplary embodiment. A person of the ordinary skill in the art can understand that the exemplary embodiment is illustrative only, constitution elements and combined processes can be modified, and such modified examples are covered by the scope of the present invention.

Overvoltage detection of whole secondary battery 20 is described above as an example, but overvoltage of each cell battery can also be detected in the same manner. When lithium ion batteries are used, overvoltage is detected in a cell unit. In this case, second overvoltage detector 12 is necessary to be provided for each cell battery. For first overvoltage detector 11, overvoltage detectors of a plurality of cell batteries can be packaged by using an ASIC, for example.

In the above description, an example in which the overvoltage detector is duplicated is described. On that point, it is also possible to duplicate a detector that detects another abnormality of a battery, and to apply the above-described processing to such a configuration.

Figure 6:
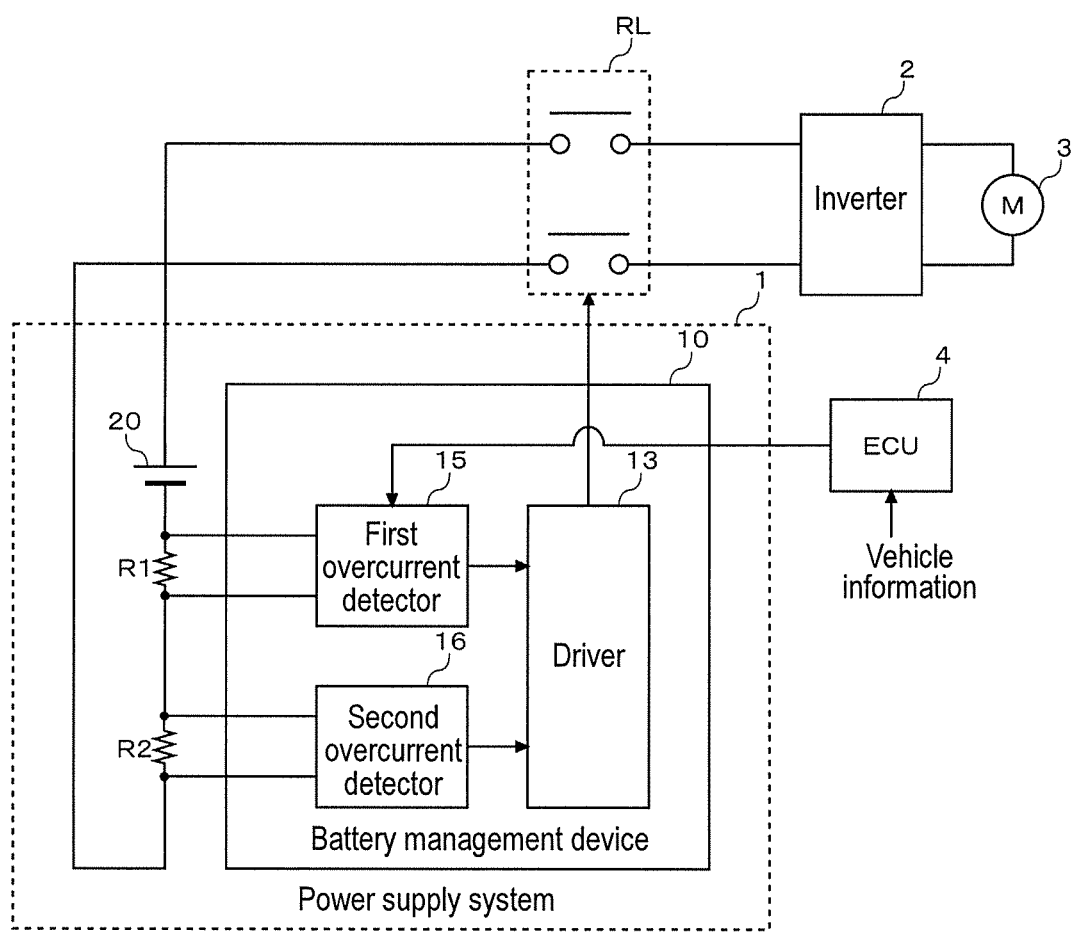
FIG. 6 is a diagram for describing a power supply system according to a modified example.

FIG. 6 is a diagram for describing power supply system 1 according to a modified example. In FIG. 6, a configuration in which an overcurrent detector is duplicated is illustrated. In order to detect overcurrent, first resistor R1 and second resistor R2 are disposed in series with secondary battery 20. First resistor R1 and second resistor R2 each are configured with a shunt resistor. First overcurrent detector 15 detects a current flowing through secondary battery 20 from a voltage across first resistor R1, and thus detects overcurrent. Second overcurrent detector 16 detects a current flowing through secondary battery 20 from a voltage across second resistor R2. Similarly to first overvoltage detector 11 and second overvoltage detector 12, first overcurrent detector 15 is controlled by software, and second overcurrent detector 16 is controlled by hardware. Furthermore, the discharge-stop permitting/prohibiting signal from ECU 4 is input to only first overcurrent detector 15. Note that Hall elements may be used instead of first resistor R1 and second resistor R2.

Alternatively, in order to detect a temperature abnormality of secondary battery 20, a temperature abnormality detector may be duplicated by providing two thermistors. Alternatively, a detector that detects a voltage drop abnormality of secondary battery 20 may be duplicated.

The invention claimed is:

1. A battery management device that manages a secondary battery that is to be mounted on a vehicle, the battery management device comprising:
   a driver configured to drive a switch inserted in a current path between the secondary battery and an inverter that drives a motor;
   a first abnormality detector configured to instruct the driver to turn off the switch when an abnormality of the secondary battery is detected; and
   a second abnormality detector that is disposed in parallel with the first abnormality detector, and instructs the driver to turn off the switch when the abnormality of the secondary battery is detected, wherein:
   in a case where an electronic controller that manages and controls the vehicle instructs stop permission of the secondary battery, the first abnormality detector instruct the driver to turn off the switch when the abnormality of the secondary battery is detected,
   in a case where the electronic controller instructs discharge-stop prohibition of the secondary battery, the first abnormality detector suspends an instruction to turn off the switch to the driver, even when the abnormality of the secondary battery is detected, and
   the second abnormality detector instructs the driver to turn off the switch after a lapse of a certain time from when the abnormality of the secondary battery is detected, regardless of an instruction from the electronic controller.

2. The battery management device according to claim 1, wherein the first abnormality detector instructs the driver to turn off the switch after the lapse of the certain time from when the abnormality of the secondary battery is detected, in cases where the electronic controller instructs the discharge-stop prohibition of the secondary battery.

3. The battery management device according to claim 1, wherein
   the first abnormality detector and the second abnormality detector are respectively a first overvoltage detector and a second overvoltage detector that instruct the driver to turn off the switch when overvoltage of the secondary battery is detected,
   the first overvoltage detector includes a microcontroller that receives a voltage of the secondary battery and a signal from the electronic controller and outputs an instruction signal to the driver, and
   the second overvoltage detector includes a comparator configured to compare the voltage of the secondary battery with a voltage for overvoltage detection, and a delay circuit configured to delay an output signal of the comparator by the certain time.

4. A power supply system comprising:
   a secondary battery that is to be mounted on a vehicle; and
   a battery management device, which manages the secondary battery, wherein:
   the battery management device comprises:
      a driver configured to drive a switch inserted in a current path between the secondary battery and an inverter that drives a motor;
      a first abnormality detector configured to instruct the driver to turn off the switch when an abnormality of the secondary battery is detected; and
      a second abnormality detector that is disposed in parallel with the first abnormality detector, and instructs the driver to turn off the switch when the abnormality of the secondary battery is detected,
   in a case where an electronic controller that manages and controls the vehicle instructs stop permission of the secondary battery, the first abnormality detector instruct the driver to turn off the switch when the abnormality of the secondary battery is detected,
   in a case where the electronic controller instructs discharge-stop prohibition of the secondary battery, the first abnormality detector suspends an instruction to turn off the switch to the driver, even when the abnormality of the secondary battery is detected, and
   the second abnormality detector instructs the driver to turn off the switch after a lapse of a certain time from when the abnormality of the secondary battery is detected, regardless of an instruction from the electronic controller.

* * * * *